US008943348B2

United States Patent
Lin et al.

(10) Patent No.: US 8,943,348 B2
(45) Date of Patent: Jan. 27, 2015

(54) METHOD AND SYSTEM FOR OFFLOADING A COMPUTATION TO OTHER COMPUTING UNITS IN THE SAME DEVICE OR TO A SERVER ON A NETWORK BASED UPON A COMPUTING TIME AND A POWER CONSUMPTION OF EACH OF THE COMPUTING UNITS AND THE SERVER

(75) Inventors: Ying-Dar Lin, Hsinchu (TW); Ting-Jun Huang, Hsinchu (TW); Yuan-Cheng Lai, Hsinchu (TW); Tsung-Hsien Chu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 359 days.

(21) Appl. No.: 13/477,063

(22) Filed: May 22, 2012

(65) Prior Publication Data

US 2013/0205158 A1  Aug. 8, 2013

(30) Foreign Application Priority Data

Feb. 3, 2012  (TW) .............................. 101103616 A

(51) Int. Cl.
*G06F 1/00* (2006.01)
*G06F 11/30* (2006.01)

(52) U.S. Cl.
USPC ........................................................ 713/340

(58) Field of Classification Search
CPC .............. G06F 9/5005; G06F 17/5077; G06F 11/0709; G06F 1/329
USPC ........................................................ 713/340
See application file for complete search history.

(56) References Cited

U.S. PATENT DOCUMENTS

| 7,636,372 | B2 | 12/2009 | Fan et al. |
| 2003/0101265 | A1* | 5/2003 | Dantzig et al. ................ 709/226 |
| 2010/0057941 | A1 | 3/2010 | Fan et al. |
| 2012/0072481 | A1* | 3/2012 | Nandlall et al. .............. 709/203 |

OTHER PUBLICATIONS

Li et al., "Computation Offloading to Save Energy on Handheld Devices: A Partition Scheme," Proceedings of the International conference on Compilers, architecture, and synthesis for embedded systems, Nov. 2001, pp. 238-246.

(Continued)

*Primary Examiner* — Jaweed A Abbaszadeh
*Assistant Examiner* — Xuxing Chen
(74) *Attorney, Agent, or Firm* — Jianq Chyun IP Office

(57) ABSTRACT

A decision method considering time and power consumption for offloading computations is provided. The method includes: obtaining a computing mission; obtaining a plurality of static effect factors from an effect factor table; collecting a plurality of dynamic effect factors. The method also includes: generating power consumptions and computing time that each of the computing unit and each of the server consumes according to the dynamic effect factors and the static effect factors; calculating cost values of executing the computing mission according to the power consumptions and the computing time; determining a target unit to execute the computing mission according to the cost values, in which the target unit is a computing unit or a server; executing the computing mission by the target unit. Therefore, the power consumptions and the computing time are simultaneously considered, and computations are adequately allocated to one of the computing unit and the servers.

10 Claims, 3 Drawing Sheets

(56) References Cited

OTHER PUBLICATIONS

Kumar et al., "Cloud Computing for Mobile Users: Can Offloading Computation Save Energy?," IEEE Computer Society 43 (4), Apr. 2010, pp. 51-56.
Wang et al., "Energy-Aware Real-time Face Recognition System on Mobile CPU-GPU Platform," 2010 International Workshop on Computer Vision on GPU, 2010, pp. 1-12.
Lin et al., "VPN Gateways over Network Processors: Implementation and Evaluation," Journal of Internet Technology 11 (4), Jul. 2010, pp. 1-7.
Miettinen et al., "Energy efficiency of mobile clients in cloud computing," Proceedings of the 2nd USENIX conference on HOT topics in cloud computing, 2010, pp. 1-7.

* cited by examiner

METHOD AND SYSTEM FOR OFFLOADING A COMPUTATION TO OTHER COMPUTING UNITS IN THE SAME DEVICE OR TO A SERVER ON A NETWORK BASED UPON A COMPUTING TIME AND A POWER CONSUMPTION OF EACH OF THE COMPUTING UNITS AND THE SERVER

CROSS-REFERENCE TO RELATED APPLICATION

This application claims the priority benefit of Taiwan application serial no. 101103616, filed on Feb. 3, 2012. The entirety of the above-mentioned patent application is hereby incorporated by reference herein and made a part of this specification.

TECHNICAL FIELD

The invention relates to a technology of offloading computations, especially to a decision method considering time and power consumption at the same time as well as a system using the same.

BACKGROUND

As the speed of network grows faster and faster and the mobile device becomes more and more popularized, the technology of cloud computing also becomes important day by day. The main object of cloud computing is to offload the computations on a device to other servers with better computing capability through the network, such that the computing time and the power consumption on the device may be reduced. However, not every computing mission is suitable to be offloaded to a server on the network due to that the additional power and computing time would have to be consumed to transmit a computing mission if the same were to be offloaded to a server. On the other hand, given that several computing units are disposed on a general computing system or a mobile device; thus, the other way for offloading is to offload the computing mission to other computing units in the same device.

Generally speaking, a computing mission suitable to be offloaded to the server needs to have a few properties, that is, the computing mission needs to be large in the amount of computations and small in the amount of data. For example, if a chess game is executed on a mobile device, the data which needs to be transmitted to offload the game to a server is only the data describing the entire chessboard, yet it may need a great amount of computations. Therefore, the chess game is suitable to be offloaded to a remote server, while computing missions suitable to be offloaded to other computing units in the same device may need to have different properties. Thus, the problem that the research persons of the art care about is how to adequately offload a computing mission to a server or a computing unit while considering the power consumption and computing time at the same time.

SUMMARY

The invention has provided a decision method for offloading computations and a computing system using the same, which may decide whether to offload a computing mission by considering both power consumption and time consumption.

The invention provides a decision method for offloading computations considering both time consumption and power consumption, and the decision method is used in a computing system. The computing system includes a plurality of computing units and is coupled to at least one server. The decision method for offloading computations includes: obtaining a computing mission, obtaining a plurality of static effect factors from an effect factor table of the computing system; and collecting a plurality of dynamic effect factors. The decision method for offloading computations further includes: generating power consumptions and computing time that each computing unit and each server consumes to execute the computing mission according to the dynamic effect factors and the static effect factors; calculating the cost values of each computing unit and each server executing the computing mission according to the power consumptions and the computing time; determining a target unit to execute the computing mission according to the cost values, wherein the target unit is either one of the computing units or one of the servers; and transmitting the computing mission to the determined target unit in which the computing mission is executed.

In an embodiment of the invention, the step of obtaining the static effect factors from the effect factor table of the computing system further includes: determining whether the computing system has generated the effect factor table; and creating the effect factor table if the same has not yet been generated by the computing system.

In an embodiment of the invention, the step of transmitting the computing mission to the target unit in which the computing mission is executed further includes: updating the effect factor table according to the result of executing the computing mission by the target unit.

In an embodiment of the invention, the step of calculating the cost values of each computing unit and each server executing the computing mission according to the power consumptions and the computing time further includes: calculating the cost values according to equations (1), (2) and (3), $$\epsilon_T^P = (\hat{T}_p - \hat{T}_{cpu})/T_{cpu} \qquad (1)$$

$$\epsilon_E^P = (\hat{E}_p - \hat{E}_{cpu})/\hat{E}_{cpu} \qquad (2)$$

$$C_P = \alpha \cdot \epsilon_T^P + (1-\alpha) \cdot \epsilon_E^P \qquad (3)$$

wherein, an native CPU is a main computing unit of the computing units; p is a comparative computing unit which is either one of the computing units or one of the servers; $C_P$ is the cost value of the comparative computing units. $\hat{T}_p$ is the computing time consumed when the comparative computing unit executes the computing mission; $\hat{E}_p$ is the power consumption consumed when the comparative computing unit executes the computing mission; $\hat{T}_{cpu}$ is the computing time that consumed when the main computing unit executes the computing mission. $\hat{E}_{cpu}$ is the power consumption consumed when the main computing unit executes the computing mission; α is a real number which is equal to or greater than 0 and less than or equal to 1; furthermore, the comparative computing unit having the smallest cost value is set to be the target unit.

From another perspective, the invention also provides a computing system. The computing system includes a network interface, a memory, a plurality of computing units, and an offloading decision unit, wherein the network interface is used for connecting to at least one server. An effect factor table is stored in the memory. The offloading decision unit is coupled to the network interface, the memory and the computing unit to receive a computing mission, wherein the offloading decision unit obtains a plurality of static effect factors from the effect factor table, and collects a plurality of dynamic effect factors. The offloading decision unit generates the power consumption and computing time that each computing unit and each server consumes to execute the computing mission according to the obtained dynamic effect factors and static effect factors. The offloading decision unit calculates the cost values of each computing unit and each server executing the computing mission according to the power consumption and computing time. The offloading decision unit further determines a target unit according to the calculated cost value to execute the computing mission, wherein the target unit is either one of the computing units or one of the servers. The offloading decision unit transmits the computing mission to the target unit in which the computing mission is executed.

In an embodiment of the invention, the foregoing offloading decision unit is further configured to determine whether the computing system has generated the effect factor table; the offloading decision unit creates an effect factor table if the same has not yet been generated by the computing system.

In an embodiment of the invention, the foregoing dynamic effect factors include a computation quantity of the computing mission, a computing speed of each of the servers and an network speed.

In an embodiment of the invention, the foregoing static effect factors include the speed of the memory and the computing speed of each of the computing units.

In an embodiment of the invention, the foregoing offloading decision unit is further configured to update the effect factor table according to the result of executing the computing mission by the target unit.

In an embodiment of the invention, the foregoing offloading decision unit is further configured to calculate the cost values according to the equations (1), (2) and (3) of the above, and set the comparative computing unit having the smallest cost value to be the target unit.

Based on the above, the computing system and the decision method for offloading computations provided by the invention may consider both the power consumption and computing time at the same time, and generate the cost values according to the power consumption, the computing time, and a variable. The users may calculate different cost values by adjusting the variable. Based on the cost values, proper decision about whether to offload the computing mission can be made.

In order to make the aforementioned features and advantages of the invention more comprehensible, embodiments accompanying with figures are described in detail below.

DETAILED DESCRIPTION OF DISCLOSED EMBODIMENTS

Figure 1:
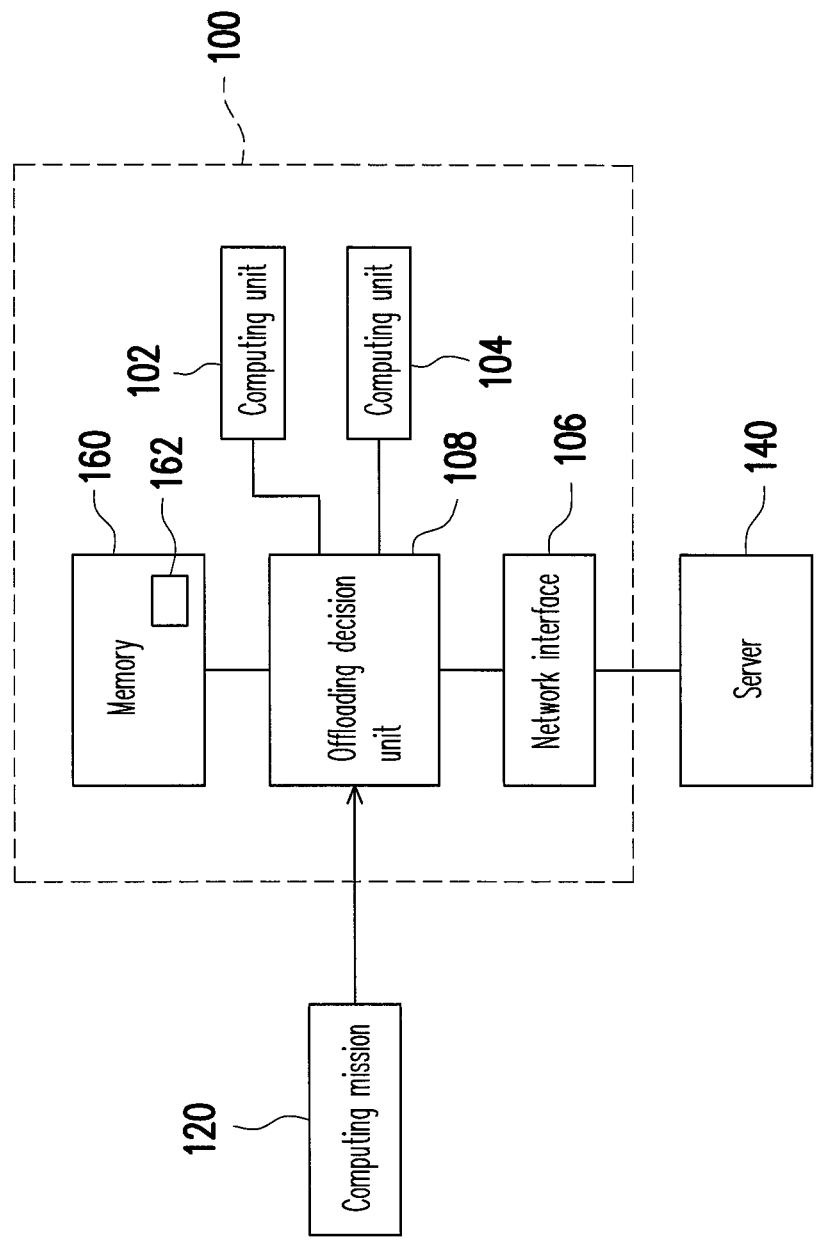
FIG. 1 is a block diagram illustrating the computing system according to an embodiment.

FIG. 1 is a block diagram illustrating the computing system according to an embodiment of the invention.

Please refer to FIG. 1. The computing system 100 is coupled to the server 140, receives the computing mission 120, and determines whether to offload the computing mission 120 to the server 140. Alternatively, the computing system 100 includes a plurality of computing units, and the computing system 100 is used for determining which of the computing units is used to execute the computing mission 120. Specifically, the computing system 100 may consider the server 140 or the plurality of computing units in the computing system at the same time to determine whether to offload the computing mission 120 to the server 140 or to one of the foregoing computing units. In the embodiment, the computing system 100 is a mobile device, for example, a smart phone. However, in other embodiments, the computing system 100 may also be a desktop computer or a notebook computer, and the invention should not be limited thereto.

The computing mission 120 may be, for example, a computing of matrix multiplication or a computing of three-dimensional image illustration, but the content of computing mission 120 is not limited by the invention.

The server 140 may be, for example, a large computing device with better computing capability than the computing system 100. However, the scale and the computing capability of the server 140 are not limited by the invention. On the other hand, in other embodiments, the computing system 100 may be coupled to more servers, and the computing system 100 may determine that to which server that the computing mission 120 is to be offloaded. The numbers of the servers that the computing system 100 is coupled to are not limited by the invention.

The computing system 100 includes a computing unit 102, computing unit 104, network interface 106, offloading decision unit 108 and memory 160.

The computing unit 102 is, for example, a central processing unit (CPU) which is a main computing unit of the computing system 100, and the computing unit 104 is, for example, a graphics Processing Unit (GPU), which is used for processing specific computing. However, in the invention, the computing unit 104 may also be set as the main computing unit, and the same may also be a microprocessor. In other embodiments, the computing units 102 and 104 may also be the two cores in the same processor, and the type of the computing units 102 and 104 is not limited by the invention. On the other hand, the computing system 100 in the embodiment includes two computing units; however, in other embodiments, the computing system 100 may also include more computing units; the computing system 100 may determine to which of the computing units that the computing mission 120 is assigned to execute, and the numbers of the computing units is not limited by the invention.

The network interface 106 is coupled to the server 140. For example, the network interface 106 is a network interface card complied with WIFI. However, the network interface 106 may also be devices which are complied with other network protocols or other communication protocols, and the invention is not limited thereto.

The memory 160 is used for storing the data of the computing system 100, for example, it may be a dynamic random access memory (DRAM). However, the memory 160 may also be a static random access memory, a hard disk, and a non-volatile flash memory; the invention is not limited thereto. Specifically, a effect factor table 162 is stored in the memory 160. The effect factor table 162 is used for storing a plurality of static effect factors. The static effect factors are not easily changed by time or the environment, but would affect the power consumptions and computing time when the computing mission 120 is executed. For example, the static effect factors are the computing speed of the computing units 102 and 104 (e.g., the clock frequency of computing unit 102). Alternatively, the static effect factor may be the memory speed of memory 160, for example, the bandwidth of memory 160. The computing system 100 may determine to which computing unit or server that the computing mission 120 is offloaded according to the static effect factors in the effect factor table 162.

The offloading decision unit 108 is coupled to the computing unit 102, computing unit 104, the memory 160 and the network interface 106. For example, the offloading decision unit 108 is an application-specific integrated circuit (ASIC). However, the offloading decision unit 108 may also be a microprocessor; the type of offloading decision unit is not limited by the invention. The offloading decision unit 108 is used for receiving the computing mission 120 and determining which of the computing units or servers is to be used for executing the computing missions 120. In another embodiment, the function that executed by offloading decision unit 108 may also be implanted as the program codes, which is executed by a computing unit.

Specifically, the offloading decision unit 108 obtains the static effect factors from the effect factor table 162 in advance. For example, the offloading decision unit 108 obtains the computing speed of computing units 102 and 104, as well as the memory speed of memory 160. Due to that the static effect factors do not change frequently, for example, the bandwidth of memory 160 is a fixed value; therefore, the computing system 100 stores the static effect factors in the effect factor table of the memory 160. On the other hand, the offloading decision unit 108 further determines that whether the computing system 100 has created the effect factor table 162. If the offloading decision unit 108 determines that the effect factor table 162 has not yet been generated, a new effect factor table 162 is created, and the static effect factors are collected to be stored in the effect factor table 162.

The offloading decision unit 108 further collects a plurality of dynamic effect factors, which are the variables that may be changed by time or the environment. For example, the dynamic effect factors are the computing speed of the server 140, the speed of network and the computations of the computing mission 120. Due to the rapid changes in the various statuses on the network, the speed by which the computer device 100 connected to the network may be changed at all time. For example, the route through which the computing system 100 sends out a package may be changed after a period of time. Alternatively, in an embodiment, the computing system 100 is connected to the server 140 through a wireless network, and a communication quality of a wireless network changes constantly. Therefore, the offloading decision unit 108 would obtain the current speed of network in advance. On the other hand, the computing speed of the server 140 may change constantly. For example, many users may offload computations to the server 140 at certain time points, such that the loading of the server 140 is increased; thus the computing resources that can be allocated to computing system 100 are decreased. Therefore, the offloading decision unit 108 further obtains the current computing speed of the server 140. And, the computations of computing mission 120 may also not be constant, either. For example, the computing mission 120 is a computing of matrix multiplication; however, the size of the multiplied matrix is not constant, such that the computations required for the matrix multiplication are different. That is to say, the offloading decision unit 108 may obtain a plurality of dynamic effect factors that affect the calculation according to the current status of the computing system 100.

Once the static effect factors and dynamic effect factors as described above are obtained, the offloading decision unit 108 generates the power consumption and computing time that computing units 102 and 104 consumes when executing the computing mission 120, according to the static effect factors and dynamic effect factors. For example, when the computing unit 102 has lower computing speed, the computing time that the computing unit 102 consumes to execute the computing mission 102 is longer. When the speed of the network at the moment is slow, both the power consumption and computing time it takes to offload the computing mission 120 are increased. Alternatively, when a computations quantity of computing mission 120 is large, the computing system 100 does not need to consume the power for executing the computing mission 120 if the computing mission 120 is offloaded to the server 140. However, if the computing mission 120 is offloaded to the server 140, additional power is required to be consumed by the computing system 100 to transmit the computing mission 120. The offloading decision unit 108 would generate power consumptions and computing time that each computing unit and server consumes when executing the computing mission 120, and thereby determines which computing unit or server is used for executing the computing mission 120.

Next, the offloading decision unit 108 calculates the cost values of each of the computing units 102, 104 and server 140 executing the computing mission 120 according to the generated power consumption and computing time. The cost values represent how much it costs when the computing unit or the server executes the computing mission 120.

A computing unit in the computing system 100, for example, the computing unit 102, is set to be the main computing unit by the offloading decision unit 108. Next, the offloading decision unit 108 calculates the cost values of other computing units or servers based on the power consumption and computing time consumed by computing unit 102 when executing the computing mission 120. In detail, the offloading decision unit 108 calculates the cost values of each computing unit and each server based on the following equations (1), (2) and (3).

$$\epsilon_T^P = (\hat{T}_P - \hat{T}_{cpu})/T_{cpu} \quad (1)$$

$$\epsilon_E^P = (\hat{E}_P - \hat{E}_{cpu})/\hat{E}_{cpu} \quad (2)$$

$$C_P = \alpha \cdot \epsilon_T^P + (1-\alpha) \cdot \epsilon_E^P \quad (3)$$

In the equations, "cpu" is a main computing unit of the computing system 100, and is represented as the computing unit 102 in the embodiment. "p" is a comparative computing unit, which is the computing unit 102, the computing unit 104, or the server 140. That is to say, the comparative computing unit is used for comparing with the main computing unit 102, and calculating the cost value of the comparative computing unit. "$C_P$" is the cost value of the comparative computing unit. $\hat{T}_P$ is the computing time that the comparative computing unit consumes to execute the computing missions 120. $\hat{E}_P$ is the power consumption that the comparative computing unit consumes to execute the computing mission. $\hat{T}_{cpu}$ is the computing time that the main computing unit consumes to execute the computing mission 120. $\hat{E}_{cpu}$ is the power consumption that the main computing unit consumes to execute the computing mission 120. At last, $\alpha$ is a real number which is equal to or greater than 0 and less than or equal to 1, and may be adjusted by the users.

The equation (1) represents calculating the difference between the computing time of the comparative computing unit and the computing time of the main computing unit when executing the computing mission 120. The equation (2) represents calculating the difference of power consumption of the comparative computing unit and the power consumption of the main computing unit when executing the computing mission 120. The equations (1), (2) and (3) together represent that the fewer computing time and power consumption it takes when a comparative computing unit executing the computing mission 120, the lower the calculated cost value there will be. In addition, the cost value is the sum of the computing time and power consumption multiplied with α and 1−α respectively. Therefore, when the user considers the computing time is more important, α may be adjusted to a bigger value. When the user considers the power consumption is more important, α may be adjusted to a less value. For example, if the computing system 100 is a mobile device, α may be adjusted to a less value due to the limited battery capacity of the mobile device. At this time, the comparative computing unit (e.g., the server 140) which have fewer power consumption may have chance to execute the computing mission 120. In another embodiment, the computing system 100 is a desktop computer, which has better computing capability than the mobile device. In this case, what a user cares about is the computing time; therefore, α may be adjusted to a grater value. However, α is a value that may be adjusted based on the need, and the value of α is not limited by the invention.

According to the equations (1), (2) and (3), the offloading decisions unit 108 determines a comparative computing unit (i.e., either the computing units 102, 104 or the server 140) with the smallest cost value to be a target unit. The target unit is the computing unit or the server for executing the computing mission 120. Therefore, the offloading decision unit 108 may further transmit the computing mission 120 to the determined target unit, in which the computing mission 120 is executed. The offloading decision unit 108 may transmit the computing mission to the server 140 through the network interface 106 if the target unit is the server 140.

When the computing mission 120 is accomplished by the target unit, the offloading decision unit 108 may update the effect factor table 162 according to the result of executing the computing mission by the target unit. For example, the offloading decision unit 108 may update the static effect factors in the effect factor table 162, and there may be only a part of the static effect factors that have been changed; therefore, the offloading decision unit 108 only needs to update a part of the data of the effect factor table 162, and it is not necessary to rewrite the whole computing result.

Figure 2:
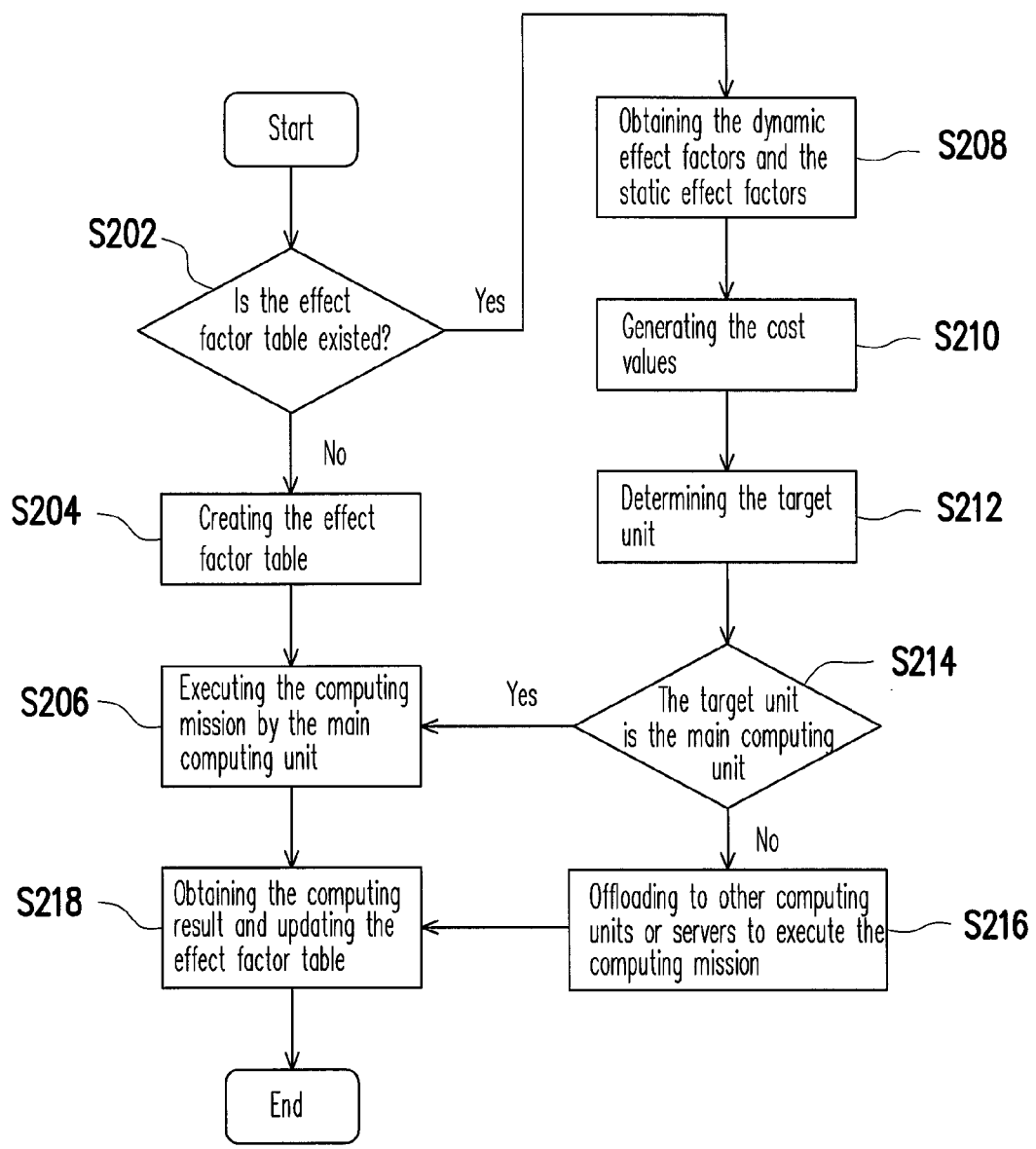
FIG. 2 is a flow chart illustrating operations of the offloading decision unit according to an embodiment.

FIG. 2 is a flow chart illustrating operations of the offloading decision unit according to an embodiment of the invention.

Please refer to FIG. 2. In the step S202, the offloading decision unit 108 may determine whether the effect factor table exists. If it does, the step S208 is performed; if it does not, the step S204 is preformed.

In the step S204, the offloading decision unit 108 creates the effect factor table. Next, in the step S206, the offloading decision unit 108 transmits the computing mission to the main computing unit in which the computing mission is executed.

In the step S208, the offloading decision unit 108 obtains the dynamic effect factors and the static effect factors. Next, in the step S210, the offloading decision unit 108 generates the cost values of each computing unit and each server according to the dynamic effect factors and the static effect factors. In the step S212, the offloading decision unit 108 determines the target unit according to the cost values. In the step S214, the offloading decision unit 108 may determine whether the target unit is a main computing unit. If it is, the step S206 is performed; otherwise, the step S216 is performed.

In the step S216, the offloading decision unit 108 may offload the computing mission to the computing units or servers other than the main computing unit to execute the computing mission. In the step S218, the offloading decision unit 108 obtains the result of executing the computing mission by the target unit, and update the effect factor table according to the computing result. At last, the process in FIG. 2 is finished.

However, each of the steps in FIG. 2 has been described as the above and is therefore not to be reiterated herein.

Figure 3:
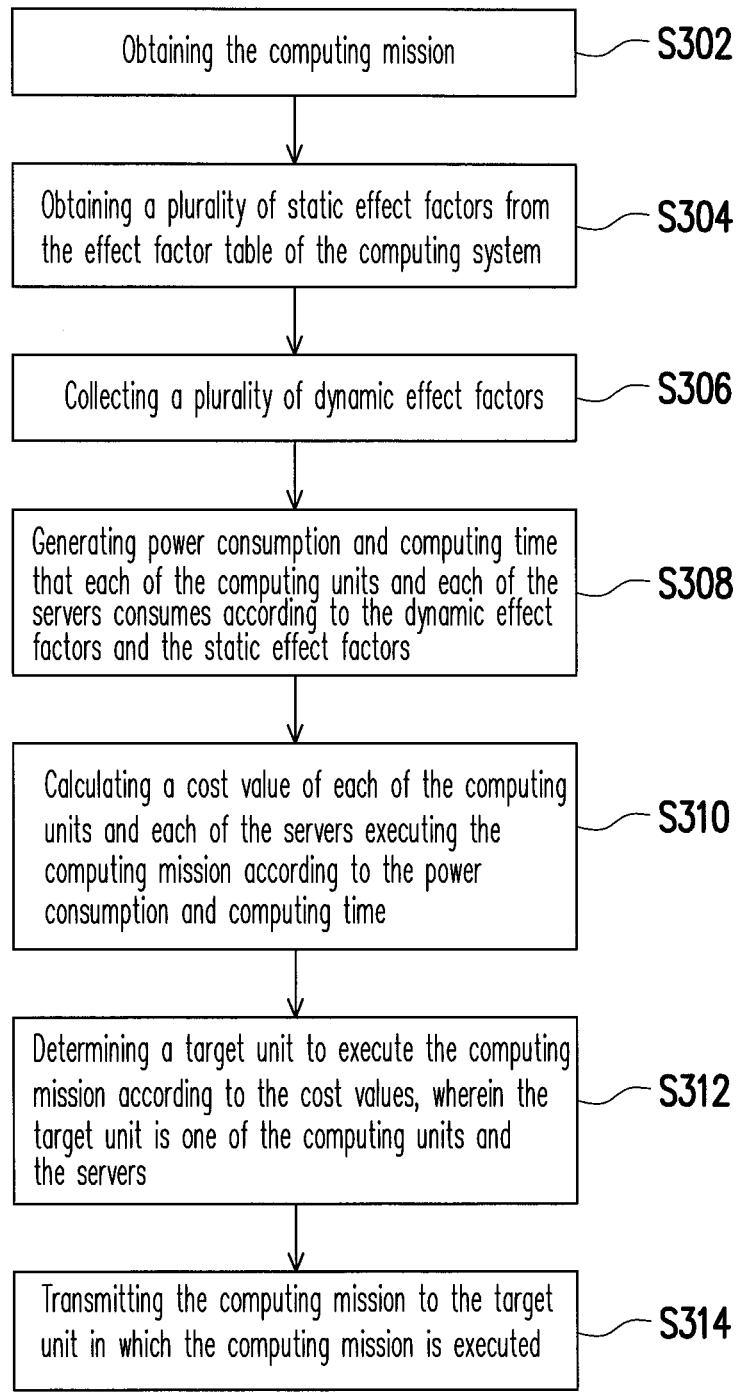
FIG. 3 is a flowchart illustrating the decision method for offloading computations according to an embodiment.

On the other hand, a decision method for offloading computations is also provided by the invention. FIG. 3 is a flowchart illustrating the decision method for offloading computations according to an embodiment of the invention.

Please refer to FIG. 3. In the step S302, a computing mission is obtained. In the step S304, a plurality of static effect factors are obtained from an effect factor table of the computing system. In the step S306, a plurality of dynamic effect factors are collected. In the step S308, the power consumption and computing time that each computing unit and server consumes when executing the computing mission are generated according to the dynamic effect factors and the static effect factors. In the step S310, the cost values of each computing unit and each server executing the computing mission are calculated according to the power consumption and computing time. In the step S312, a target unit is determined to execute the computing mission according to the cost values, wherein the target unit is either one of the computing units or one of the servers. In the step S314, the computing mission is transmitted to the target unit, in which the computing mission is executed.

Noted that the performed sequence of the steps S304 and S306 may be switched, and the invention is not limited thereto. In addition, each of the steps in FIG. 3 has been described as the above and is therefore not to be reiterated herein.

Based on the above, the computing system and the decision method for offloading computations provided by the invention determines a cost value according to the power consumption and computing time that each computing unit and server consumes when executing the computing mission. In addition, a user may control the importance between the power consumption and computing time by adjusting a variable. Based on the variable and the cost values, it can be adequately determined whether to offload the computing mission to other computing units or servers according to different status.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A decision method considering time and power consumption for offloading computations, which is used in a computing system, wherein the computing system comprises a plurality of computing units and is coupled to at least a server, the decision method further comprises:
    obtaining a computing mission;
    obtaining a plurality of static effect factors from an effect factor table of the computing system;
    collecting a plurality of dynamic effect factors;
    generating a power consumption and a computing time of each of the computing units and each of the servers according to the dynamic effect factors and the static effect factors, wherein the power consumption and the computing time are what each of the computing units and each of the servers consumes when executing the computing mission;

calculating a cost value of each of the computing units and each of the servers executing the computing mission according to the power consumption and the computing time;

determining a target unit to execute the computing mission according to the cost values, wherein the target unit is either one of the computing units or one of the servers; and transmitting the computing mission to the target unit in which the computing mission is executed, wherein the step of calculating the cost value of each of the computing units and each of the servers according to the power consumptions and the computing times comprises:

calculating the cost value according to equations (1), (2) and (3), $$\epsilon_T^P = (\hat{T}_p - \hat{T}_{cpu})/T_{cpu} \quad (1)$$

$$\epsilon_E^P = (\hat{E}_p - \hat{E}_{cpu})/\hat{E}_{cpu} \quad (2)$$

$$C_P = \alpha \cdot \epsilon_T^P + (1-\alpha) \cdot \epsilon_E^P \quad (3)$$

wherein cpu is a main computing unit of the computing units, p is a comparative computing unit, the comparative computing unit is one of the computing units or one of the servers, $C_P$ is the cost value of the comparative computing unit, $\hat{T}_p$ is the computing time that the comparative computing unit consumes when executing the computing mission, $\hat{E}_p$ is the power consumption that the comparative computing unit consumes when executing the computing mission, $\hat{T}_{cpu}$ is the computing time that the main computing unit consumes when executing the computing mission, $\hat{E}_{cpu}$ is the power consumption that the main computing unit consumes when executing the computing mission, α is a real number which is equal to or greater than 0 and less than or equal to 1; and setting the comparative computing unit with the smallest cost value as the target unit.

2. The decision method for offloading computations as recited in claim 1, wherein the step of obtaining the static effect factors from the effect factor table of the computing system further comprises:

determining whether the computer system has generated the effect factor table; and creating the effect factor table if the effect factor table has not yet been generated by the computing system.

3. The decision method for offloading computations as recited in claim 1, wherein the dynamic effect factors comprises a computation quantity of the computing mission, a computing speed of each of the servers and at least an network speed.

4. The decision method for offloading computations as recited in claim 1, wherein the static effect factors comprises a memory speed and a computing speed of each of the computing units.

5. The decision method for offloading computations as recited in claim 1, wherein after the step of transmitting the computing mission to the target unit in which the computing mission is executed, further comprises:

updating the effect factor table according to the result of executing the computing mission by the target unit.

6. A computing system, comprising:
a network interface, connecting to at least a server;
a memory wherein an effect factor table is stored;
a plurality of computing units; and
an offloading decision unit coupled to the network interface, the memory and the computing units to receive a computing mission, wherein the offloading decision unit obtains a plurality of static effect factors from the effect factor table, wherein the offloading decision unit collects a plurality of dynamic effect factors, wherein the offloading decision unit generates a power consumption and a computing time of each of the computing units and each of the servers according to the dynamic effect factors and the static effect factors, wherein the power consumption and the computing time are what each of the computing units and each of the servers consume when executing the computing mission, wherein the offloading decision unit calculates a cost value of each of the computing units and each of the servers executing the computing mission according to the power consumption and the computing time, wherein the offloading decision unit determines a target unit to execute the computing mission according to the cost values, wherein the target unit is either one of the computing units or one of the servers, wherein the offloading decision unit transmits the computing mission to the target unit wherein the computing mission is executed, wherein the offloading decision unit is further configured to calculate the cost value according to equations (1), (2) and (3), $$\epsilon_T^P = (\hat{T}_p - \hat{T}_{cpu})/T_{cpu} \quad (1)$$

$$\epsilon_E^P = (\hat{E}_p - \hat{E}_{cpu})/\hat{E}_{cpu} \quad (2)$$

$$C_P = \alpha \cdot \epsilon_T^P + (1-\alpha) \cdot \epsilon_E^P \quad (3)$$

wherein cpu is a main computing unit of the computing units, p is a comparative computing unit, the comparative computing unit is one of the computing units or one of the servers, $C_P$ is the cost value of the comparative computing unit, $\hat{T}_p$ is the computing time that the comparative computing unit consumes when executing the computing mission, $\hat{E}_p$ is the power consumption that the comparative computing unit consumes when executing the computing mission, $\hat{T}_{cpu}$ is the computing time that the main computing unit consumes when executing the computing mission, $\hat{E}_{cpu}$ is the power consumption that the main computing consumes when executing the computing mission, α is a real number which is equal to or greater than 0 and less than or equal to 1, wherein the offloading decision unit is further configured to set the comparative computing unit with the smallest cost value as the target unit.

7. The computing system as recited in claim 6, wherein the offloading decision unit further is configured to determine whether the computing system has generated the effect factor table, the offloading decision unit creates the effect factor table if the effect factor table has not yet been generated by the computing system.

8. The computing system as recited in claim 6, wherein the dynamic effect factors comprises a computation quantity of the computing mission, a computing speed of each of the servers and at least an network speed.

9. The computing system as recited in claim 6, wherein the static effect factors comprise a memory speed and a computing speed of each of the computing units.

10. The computing system as recited in claim 6, wherein the offloading decision unit is further configured to update the effect factor table according to the result of executing the computing mission by the target unit.

* * * * *